United States Patent [19]
Beard

[11] Patent Number: 5,770,923
[45] Date of Patent: *Jun. 23, 1998

[54] POWER SUPPLY FOR AN ELECTROLUMINESCENT PANEL OR THE LIKE

[75] Inventor: Paul Beard, Milpitas, Calif.

[73] Assignee: Norand Corporation, Cedar Rapids, Iowa

[ * ] Notice: The term of this patent shall not extend beyond the expiration date of Pat. No. 5,568,016.

[21] Appl. No.: 734,942

[22] Filed: Oct. 22, 1996

Related U.S. Application Data

[63] Continuation of Ser. No. 324,648, Oct. 18, 1994, Pat. No. 5,568,016.

[51] Int. Cl.$^6$ .................................................. G09G 3/10
[52] U.S. Cl. ...................... 315/169.3; 315/219; 315/239; 315/307
[58] Field of Search ............................ 315/169.3, 169.4, 315/200 R, 205, 219, 226, 224, 246, 169.1, 291, 307, 239

[56] References Cited

U.S. PATENT DOCUMENTS

| | | |
|---|---|---|
| 3,882,357 | 5/1975 | Nieuweboer et al. ............... 315/209 R |
| 4,527,096 | 7/1985 | Kindlmann ........................... 315/169.3 |
| 4,859,911 | 8/1989 | Kinnard et al. ...................... 315/169.3 |
| 4,954,752 | 9/1990 | Young et al. ......................... 315/169.3 |
| 5,227,696 | 7/1993 | Asars .................................... 315/169.3 |
| 5,313,141 | 5/1994 | Kimball ................................ 315/169.3 |
| 5,323,305 | 6/1994 | Ikeda et al. ...................... 315/169.3 X |
| 5,345,146 | 9/1994 | Koenck et al. ....................... 315/169.3 |
| 5,559,402 | 9/1996 | Corrigan, III ........................ 315/169.3 |

*Primary Examiner*—Robert Pascal
*Assistant Examiner*—Haissa Philogene
*Attorney, Agent, or Firm*—Stanford & Bennett

[57] ABSTRACT

The present invention discloses an electroluminescent panel and a power supply circuit for applying voltages of alternating current to the electroluminescent panel. The power supply circuit is comprised of a voltage converter, an electric power source, a charge controller for controlling the transfer of energy from the power source to the electroluminescent panel, and a discharge controller for controlling the transfer of energy from the electroluminescent panel to the power source.

14 Claims, 2 Drawing Sheets

POWER SUPPLY FOR AN ELECTROLUMINESCENT PANEL OR THE LIKE

CROSS-REFERENCE TO RELATED APPLICATIONS

The present application is a continuation of U.S. application Ser. No. 08/324,648 (Attorney Docket No. DN38098), filed Oct. 18, 1994, by Paul Beard now U.S. Pat. No. 5,568,016. The U.S. application Ser. No. 08/324,648 is hereby incorporated herein by reference in its entirety.

TECHNICAL FIELD

The invention relates generally to electroluminescent backlight devices used in liquid-crystal video display systems, and specifically to a power supply unit for an electroluminescent display.

BACKGROUND ART

The video display systems of portable electronic equipment and computer data terminals commonly employ liquid-crystal displays. Liquid-crystal displays often require some form of backlighting in order for the video display to have functional brightness and visibility. The backlighting of liquid-crystal displays frequently implement electroluminescent panels to provide the necessary light intensity. Electroluminescent backlight panels are composed of an electroluminescent material that emits visible light when driven with an alternating current.

In portable battery powered electronic equipment and computer data terminals, conservation of battery energy is an important design criterion. Electroluminescent backlight panels operate at high voltages and consume a large portion of the onboard available battery power. A unique feature of the material of which the electroluminescent backlight panel consists is that it exhibits capacitive behavior, meaning it is capable of holding an electric charge, and therefore some of the energy supplied to the electroluminescent backlight is stored and unused as a result of that capacitance. Thus a concomitant feature of the electroluminescent panel is that it essentially functions as a large capacitor. The unused energy stored capacitively in the electroluminescent backlight panel may be recovered and restored back into the battery to significantly increase the duration of the battery charge.

Drive circuits for electroluminescent panels are known in the prior art which often employ transformers or other inductive devices in conjunction with the inherent capacitance of the electroluminescent panels. Kindlmann, U.S. Pat. No. 4,527,096, discloses a circuit in which an electroluminescent lamp in combination with several inductors is progressively charged with successive high frequency current pulses provided by a convertor to thereby increase the efficiency and to enhance the light output from the electroluminescent lamp. Other methods for driving electroluminescent devices also exist in the prior art. Often the inductance of the transformer, typically an autotransformer, is configured in combination with the inherent capacitance of an electroluminescent device to resonate at the desired operating frequency at which the electroluminescent device operates in order to improve power efficiency. Koenck, U.S. Pat. No. 5,345,146, describes a drive circuit for an electroluminescent panel with reduced physical transformer size, reduced current draw from the power supply battery, and accommodations for the variations in the inherent capacitance and inherent resistance of the electroluminescent devices. Koenck further describes the use of energy stored in an inductor/capacitor resonant tank circuit for driving the electroluminescent device in a subsequent charge cycle. However, the prior art does not anticipate recovering the unused energy to be restored back into the battery.

OBJECTS OF THE INVENTION

It is therefore an object of the invention to recover the unused energy stored in the electroluminescent backlight panel of a liquid-crystal display due to the inherent capacitance of the electroluminescent material.

It is another object of the invention to recharge the main power supply battery of a portable battery powered computer data terminal or other electronic equipment with the electrical energy capacitively stored in the electroluminescent backlight panel.

Additional objects, advantages and novel features of the invention will become apparent to those skilled in the art upon examination of the specification and may be learned by practice of the invention. The objects and advantages of the invention may be realized and attained by means of the instrumentalities and combinations particularly pointed out in the appended claims.

DISCLOSURE OF THE INVENTION

An electrical power supply circuit is comprised of an electric power source, a voltage converter, an electroluminescent lighting device, and at least a pair of transistors for controlling the charging and the discharging of the electroluminescent panel and the recharging of the battery. The invention essentially implements a flyback power supply system to charge an electroluminescent backlight panel typically used to illuminate liquid-crystal display panels. Because of the symmetrical configuration of the power supply circuit, an unused portion of the energy supplied to the electroluminescent backlight panel may be recovered and restored in the battery.

DESCRIPTION OF AN EXEMPLARY EMBODIMENT

Figure 1:
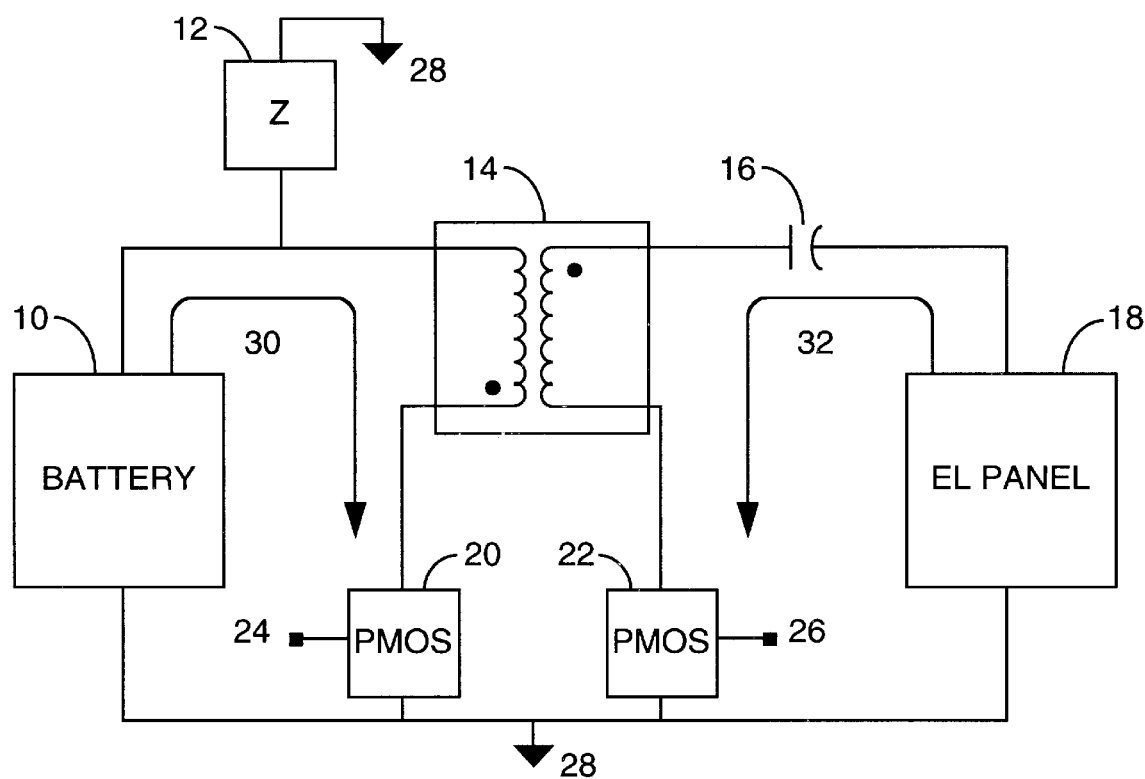
FIG. 1 is an electronic schematic diagram of the power supply circuitry in an exemplary embodiment of the invention.

FIG. 1 depicts the electronic circuitry of an exemplary electroluminescent backlight power supply unit of the present invention. The main raw battery 10 ("BATTERY") parallels to ground 28 a filtering network 12 ("Z") which stabilizes any variations in the voltage of the main raw battery 10. The main raw battery 10 is further connected to an interface transformer 14 in order to transfer power to-and-from the electroluminescent backlight panel 18 ("EL PANEL"). An exemplary transformer is neither an autotransformer nor a center-tapped transformer. The interface transformer 14 electrically isolates the main raw battery from the electroluminescent panel 18. Power is inductively transferred through the interface transformer 14. The interface transformer 14 connects to the electroluminescent panel 18 through a series blocking capacitor 16 that functions to eliminate any direct-current components that may be present in the electroluminescent panel electric mesh 32.

The main raw battery 10 electrically connects through the interface transformer 14 to a p channel metal oxide semiconductor charge control transistor 20 ("PMOS"). Additionally, the electroluminescent display panel 18 electrically connects through the interface transformer 14 to a PMOS discharge control transistor 22 ("PMOS"). The PMOS charge control transistor 20 controls the charge cycle of the electroluminescent display panel 18, and the PMOS discharge control transistor 22 controls the discharge cycle of the electroluminescent display panel. This configuration essentially implements a flyback power supply to supply power to the electroluminescent display panel 18 and to recover a portion of that power to recharge the main raw battery 10.

When the charge signal 34 (see FIG. 2) is applied to the gate 24 of the PMOS charge control transistor 20, the charge control transistor 20 is turned on causing current to flow through the main raw battery electric mesh 30. The current flowing through the main raw battery mesh 30 flows through the interface transformer 14 and thereby induces current to flow in the EL panel mesh 32. The gate 26 of the discharge control transistor 22 is held low during the charging cycle. In this configuration during the charging cycle, the discharge transistor 22 essentially acts as a forward-biased junction diode due to the characteristic behavior of its internal semiconductor junctions. The junction diode of the discharge control transistor allows the induced EL panel mesh current 32 to flow in only one direction, thereby charging the EL panel 18. Thus, energy flows from the main raw battery 10 into the electroluminescent backlight panel 18.

During the charging process energy is transferred from the main raw battery 10 to the electroluminescent panel 18. A portion of the energy supplied to the electroluminescent panel 18 is dissipated as light, which is the intended function of the electroluminescent panel 18. Another portion of the energy supplied to the electroluminescent panel 18 dissipates through inherent power losses such as power lost as heat. The remainder of the energy supplied to the electroluminescent panel 18 is capacitively stored therein.

Control of the discharge of the energy capacitively stored in the EL panel 18 is accomplished by applying the discharge signal 36 (see FIG. 2) to the gate 26 of the discharge control transistor 22. The discharge control transistor 22 is turned on causing current to flow in the EL panel electric mesh 32. The gate 24 of the charge control transistor 20 is held low during the discharge cycle causing it to function as a junction diode in the same manner as the discharge control transistor 22 functioned during the charge cycle. Thus, when one of the transistors functions as a switch the other transistor functions as a diode.

During the discharge cycle the reverse of the charge cycle occurs. The energy capacitively stored in the EL panel 18 as electric charge flows in the EL panel mesh 32 when the discharge control transistor 22 is turned on. The current flowing through the EL panel mesh 32 flows through the interface transformer 14 inducing a current to flow in the battery mesh 30. The junction diode of the charge control transistor allows the induced current to flow in only one direction in the battery mesh 30, thereby recharging the main raw battery 10. Thus, the energy stored capacitively in the electroluminescent display panel 18 flows back into the main raw battery 10.

Figure 2:
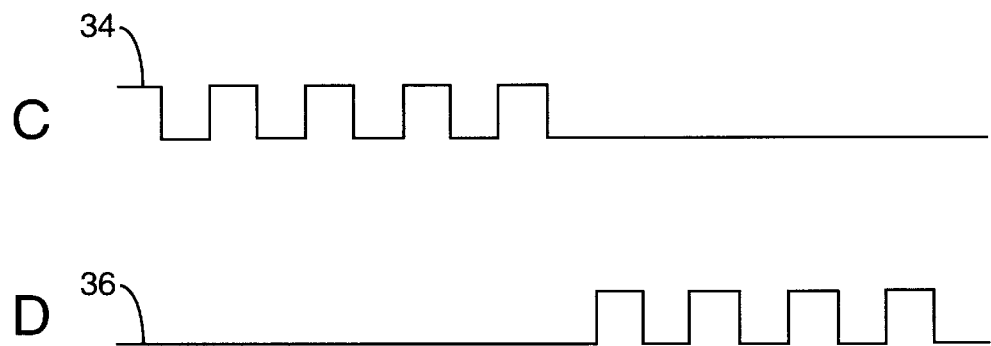
FIG. 2 is an illustration of the waveforms used to control the charge and discharge cycles of the electroluminescent backlight power supply.

FIG. 2 is a timing diagram of the charge control signal waveform 34 ("C") and the discharge control signal waveform 36 ("D") which are applied respectively to the gates 24 and 26 of the charge control transistor 20 and the discharge control transistor 22. As may be determined from this diagram, when the charge control signal 24 is time-varying the discharge control signal 26 is held low, and when the discharge control signal 26 is time-varying the charge control signal is held low. This implementation ensures that the charging of the EL panel 18 and the recharging of the main raw battery 10 do not occur simultaneously. In this embodiment, both the charge control signal 24 and the discharge control signal 26 must be time-varying signals in order to transfer energy through the interface transformer 14 because transformers operate on the principal of electromagnetic induction. In an exemplary embodiment of the invention, the preferred charge control signal waveform 34 and discharge control signal waveform 36 are positive valued pulsed waves with a frequency of 256 kHz.

Figure 3:
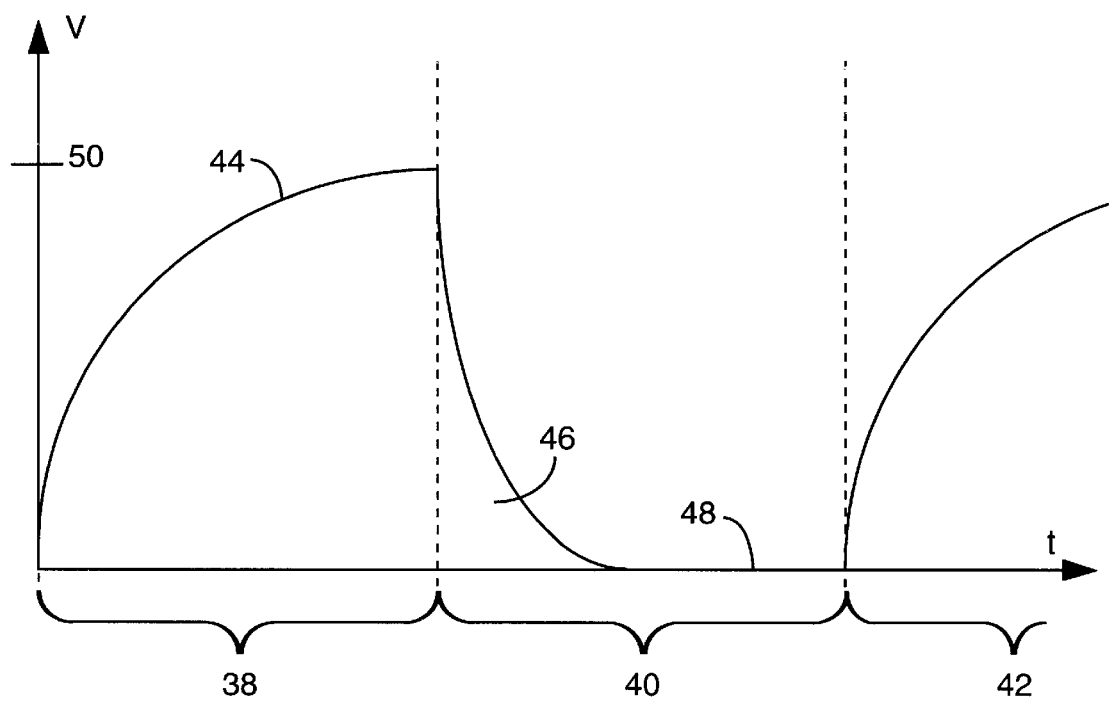
FIG. 3 is a diagram of the voltage waveform of the electroluminescent backlight power supply unit.

FIG. 3 is plot of the electroluminescent backlight panel average voltage 44 versus time illustrating the charge and discharge cycles. During the charge cycle 38 the EL panel voltage 44 increases until it has reached its maximum voltage 50. The EL panel voltage 44 then decreases during the discharge cycle 40. The area 46 under the EL panel voltage 44 during the discharge cycle 40 is proportional to the energy stored capacitively in the electroluminescent display panel 18 and then recovered to recharge the main raw battery 10. In an exemplary embodiment of the invention the amount of recovered energy is approximately 40% of the energy supplied to the EL panel 18. The period of time 38 within the discharge cycle 40 during which the EL panel voltage 44 is zero corresponds to energy supplied to the EL panel 18 but not recovered. After completion of the discharge cycle 40 the EL panel 18 is charged again during a new charge cycle 42 as the charging and the discharging of the EL panel continues in succession.

Thus, there has been described a power supply for an electroluminescent panel or the like which accomplishes at least all of the stated objects. It would now be obvious to one possessing ordinary skill in the art to combine the invention herein disclosed with the invention disclosed in U.S. Pat. No. 5,345,146 to achieve the advantages inherent with both inventions.

I claim:

1. An electronic device comprising:
    an electroluminescent light source;
    a battery power source;
    a drive circuit coupled to both the electroluminescent light source and the battery power source that delivers a charge to the electroluminescent light source; and
    the drive circuit recovers at least a portion of the charge delivered to the electroluminescent light source to recharge the battery power source.

2. The electronic device of claim 1 wherein the electroluminescent light source comprises an electroluminescent panel.

3. The electronic device of claim 1 which further comprises a housing sized for portability.

4. The electronic device of claim 3 further comprising a liquid crystal display disposed on the housing, the liquid crystal display being associated with the electroluminescent light source.

5. The electronic device of claim 1 wherein the drive circuit delivers the charge during charge cycles and recovers the at least a portion of the charge during discharge cycles.

6. A control circuit used in an electronic device having a battery power supply and an electroluminescent light source, the control circuit delivering energy from the battery power supply to the electroluminescent light source, and the control circuit comprising a recovery circuit that returns at least a portion of the energy delivered to the electroluminescent light source back to the battery power source.

7. The control circuit of claim 6 wherein the returned energy charges the battery power source.

8. The control circuit of claim 6 wherein the electroluminescent light source comprises an electroluminescent panel.

9. The control circuit of claim 6 wherein the recovery circuit returns the at least a portion of the energy that during charge cycles is delivered to the electroluminescent light source.

10. An electronic device comprising:
   a light source;
   a rechargeable power source that delivers energy to the light source;
   the light source generates light from a first portion of the delivered energy and stores a second portion of the delivered energy; and
   a recovery circuit that returns at least some part of the second portion of the energy stored by the light source to the rechargeable power source for recharging.

11. The electronic device of claim 10 wherein the light source comprises an electroluminescent panel.

12. The electronic device of claim 10 which further comprises a housing sized for portability.

13. The electronic device of claim 12 further comprising a liquid crystal display disposed on the housing, the liquid crystal display being associated with the light source.

14. The electronic device of claim 10 wherein the recovery circuit returns the at least some part of the second portion of the energy during a charge cycle.

* * * * *